United States Patent
Roy et al.

(10) Patent No.: US 12,536,215 B2
(45) Date of Patent: Jan. 27, 2026

(54) AUTOMATED GENERATION OF GOVERNING LABEL RECOMMENDATIONS

(71) Applicant: Adobe Inc., San Jose, CA (US)

(72) Inventors: Tathagato Roy, Hyberabad (IN); Nikhil Manjrekar, Indore (IN); Koyel Mukherjee, Bangalore (IN); Atharv Tyagi, New Delhi (IN); Raunak Shah, Champaign, IL (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/674,253

(22) Filed: May 24, 2024

(65) Prior Publication Data

US 2025/0363157 A1 Nov. 27, 2025

(51) Int. Cl.
G06F 16/00 (2019.01)
G06F 16/353 (2025.01)
G06F 16/383 (2019.01)

(52) U.S. Cl.
CPC .......... *G06F 16/353* (2019.01); *G06F 16/383* (2019.01)

(58) Field of Classification Search
None
See application file for complete search history.

(56) References Cited

U.S. PATENT DOCUMENTS

2010/0274770 A1* 10/2010 Gupta ................. G06F 16/285
707/688
2016/0132512 A1* 5/2016 Ripberger .......... G06F 21/6218
707/694

FOREIGN PATENT DOCUMENTS

WO WO-2023172541 A1 * 9/2023 ....... G06Q 10/06393
WO WO-2024107426 A1 * 5/2024 ............ G06N 3/047

OTHER PUBLICATIONS

Bahdanau et al., "Neural Machine Translation by Jointly Learning to Align and Translate", Published as a conference paper at ICLR 2015, 2015, pp. 1-15.

Bhargava et al., "Generalization in NLI: Ways (Not) To Go Beyond Simple Heuristics", Available at : <arXiv:2110.01518v1 [cs.CL] Oct. 4, 2021>, Oct. 4, 2021, 11 pages.

Chen et al., "A Simple Framework for Contrastive Learning of Visual Representations", Proceedings of the 37 th International Conference on Machine Learning, 2020, 11 pages.

Cong et al., "Pylon: Semantic Table Union Search in Data Lakes", Available at : <arXiv:2301.04901v2 [cs.DB] Jan. 13, 2023>, Jan. 13, 2023, 13 pages.

Devlin et al., "BERT: Pre-training of Deep Bidirectional Transformers for Language Understanding", Proceedings of NAACL-HLT, Jun. 2019, pp. 4171-4186.

(Continued)

*Primary Examiner* — Tuankhanh D Phan
(74) *Attorney, Agent, or Firm* — Shook, Hardy & Bacon L.L.P.

(57) ABSTRACT

Methods and systems are provided for facilitating generation and/or presentation of governing label recommendations for data. In embodiments described herein, a representation of a data schema associated with a dataset having a plurality of attributes is obtained. A governing label for a particular attribute of the plurality of attributes is identifying, via a machine learning model, based on the representation of the data schema associated with the dataset. Thereafter, a recommendation to assign the governing label to the particular attribute in the dataset is presented.

19 Claims, 9 Drawing Sheets

(56) References Cited

OTHER PUBLICATIONS

Fan et al., "Semantics-aware Dataset Discovery from Data Lakes with Contextualized Column-based Representation Learning", Available at : <arXiv:2210.01922v2 [cs.DB] Jan. 15, 2023>, Jan. 15, 2023, 19 pages.

Goldberg, A.V., "Finding a maximum density subgraph", Computer Science Division University of California, 1984, 14 pages.

Khatiwada et al., "SANTOS: Relationship-based Semantic Table Union Search", Proc. ACM Manag. Data, vol. 1, No. 1, May 2023. 25 pages.

Khosla et al., "Supervised Contrastive Learning", 34th Conference on Neural Information Processing Systems, 2020, 13 pages.

Khuller et al., "On Finding Dense Subgraphs", d in the proceedings of 36th International Colloquium on Automata, 2009, pp. 1-19.

Li et al., "Discovering Enterprise Concepts Using Spreadsheet Tables" In Proceedings of the 23rd ACM SIGKDD International Conference on Knowledge Discovery and Data Mining, 2017, 10 pages.

Lida et al., TABBIE: Pretrained Representations of Tabular Data, Available at : <arXiv:2105.02584v1 [cs.CL] May 6, 2021>, May 6, 2021, 11 pages.

Liu et al., "RoBERTa: A Robustly Optimized BERT Pretraining Approach", Clinical Orthopaedics and Related Research, Jul. 2019, 13 pages.

Nargesian et al., "Table Union Search on Open Data", Proceedings of the VLDB Endowment, vol. 11, No. 7, 2018, pp. 813-825.

Ota et al., "Data-Driven Domain Discovery for Structured Datasets", Proceedings of the VLDB Endowment, vol. 13, No. 7, 2020, 13 pages.

Ouellette, P. et al., "RONIN: Data Lake Exploration", http://vldb.org/pvldb/vol14/p2863-nargesian.pdf, PVLDB, pp. 2863-2866, vol. 14, No. 12, 2021.

Radford et al., "Improving Language Understanding by Generative Pre-Training", Open AI, 2018, 12 pages.

Rahm et al., "A survey of approaches to automatic schema matching", The VLDB Journal, vol. 10, 2001, pp. 334-350.

Suhara et al., "Annotating Columns with Pre-trained Language Models", Available at : <arXiv:2104.01785v2 [cs.DB] Mar. 1, 2022>, Mar. 1, 2022, 15 pages.

Turc et al., "Well-Read Students Learn Better: The Impact of Student Initialization on Knowledge Distillation", CoRR, abs/1908.08962, 2019.

Vaswani et al., "Attention Is All You Need", Advances in Neural Information Processing Systems, vol. 30, 2017, 11 pages.

Wikipedia : "Densegraph", Available at : <https://en.wikipedia.org/wiki/Densegraph>, 1 page.

Yang et al., "XLNet: Generalized Autoregressive Pretraining for Language Understanding", Available at : <arXiv:1906.08237v2 [cs.CL] Jan. 2, 2020>, Jan. 2, 2020, 18 pages.

\* cited by examiner

| LABEL | LABEL NAME | LABEL DESCRIPTION |
|---|---|---|
| I1 | DIRECTLY IDENTIFIABLE DATA | DIRECTLY IDENTIFIABLE DATA THAT CAN IDENTIFY OR CONTACT A SPECIFIC PERSON, RATHER THAN A DEVICE |
| I2 | INDIRECTLY IDENTIFIABLE DATA | INDIRECTLY IDENTIFIABLE DATA THAT CAN BE USED IN COMBINATION WITH ANY OTHER DATA TO IDENTIFY OR CONTACT A SPECIFIC PERSON |
| S1 | PRECISE GEO | DATA SPECIFYING LATITUDE AND LONGITUDE THAT CAN BE USED TO DETERMINE THE PRECISE LOCATION OF A DEVICE |
| S2 | BROAD GEO | DATA THAT CAN BE USED TO DETERMINE A BROADLY DEFINED GEOFENCE AREA |
| C2 | NO THIRD-PARTY EXPORT | DATA CAN'T BE EXPORTED TO A THIRD-PARTY |
| C3 | NO DIRECTLY IDENTIFIABLE COMBINATION | DATA CAN'T BE USED IN CONJUNCTION WITH DIRECTLY IDENTIFIABLE INFORMATION |
| C4 | NO TARGETING OF ANY TYPE | DATA CAN'T BE USED FOR TARGETING ANY ADS OR CONTENT, EITHER ON-SITE OR CROSS-SITE |
| C9 | NO DATA SCIENCE | DATA CAN'T BE USED IN DATA SCIENCE WORKFLOWS |

FIG. 3 ns, in accordance with various embodiments of the present disclosure.

AUTOMATED GENERATION OF GOVERNING LABEL RECOMMENDATIONS

BACKGROUND

Fine-tuning a language model includes training a pre-trained language model on a smaller dataset that is specific to a task to provide a more accurate model tailored to particular needs. Oftentimes, a pre-trained language model is fine-tuned using a dataset of human-labeled data for a specific task or domain. Accordingly, such fine-tuning requires human annotation. As human annotations and labeling can be provided in different formats, fine-tuning datasets including human feedback or annotations can be incompatible with one another due to different formats of supervisions. For example, one labeled dataset may include human feedback in a binary format that indicates a preference of one response over another response to a prompt, while another labeled dataset may include human feedback in a numerical format that indicates an extent of interest or preference of a response to a prompt.

SUMMARY

Various aspects of the technology described herein are generally directed to systems, methods, and computer storage media for, among other things, facilitating generation of governing label recommendations for data in an efficient and effective manner. In particular, recommendations for governing labels are automatically generated for data attributes without examining the data content (e.g., data column contents). To do so, and at a high level, a schema, or attribute level hierarchical path of an attribute, is used to predict a governing label relevant to a set of data. In some cases, governing label recommendations may be provided for data attributes or columns missing label information. In other cases, governing label recommendations may be provided for various data attributes of a dataset (e.g., each data attribute). A data attribute generally refers to a specific characteristic or property of a data entity. Generally, a data attribute is represented as a column in a dataset, with each column containing values corresponding to a specific attribute for each data record or entity. Data attributes can be various types of data, such as numerical data, categorical data, textual data, temporal data, spatial data, etc.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 provides an example label set, in accordance with embodiments of the present disclosure.

DETAILED DESCRIPTION

Figure 1:
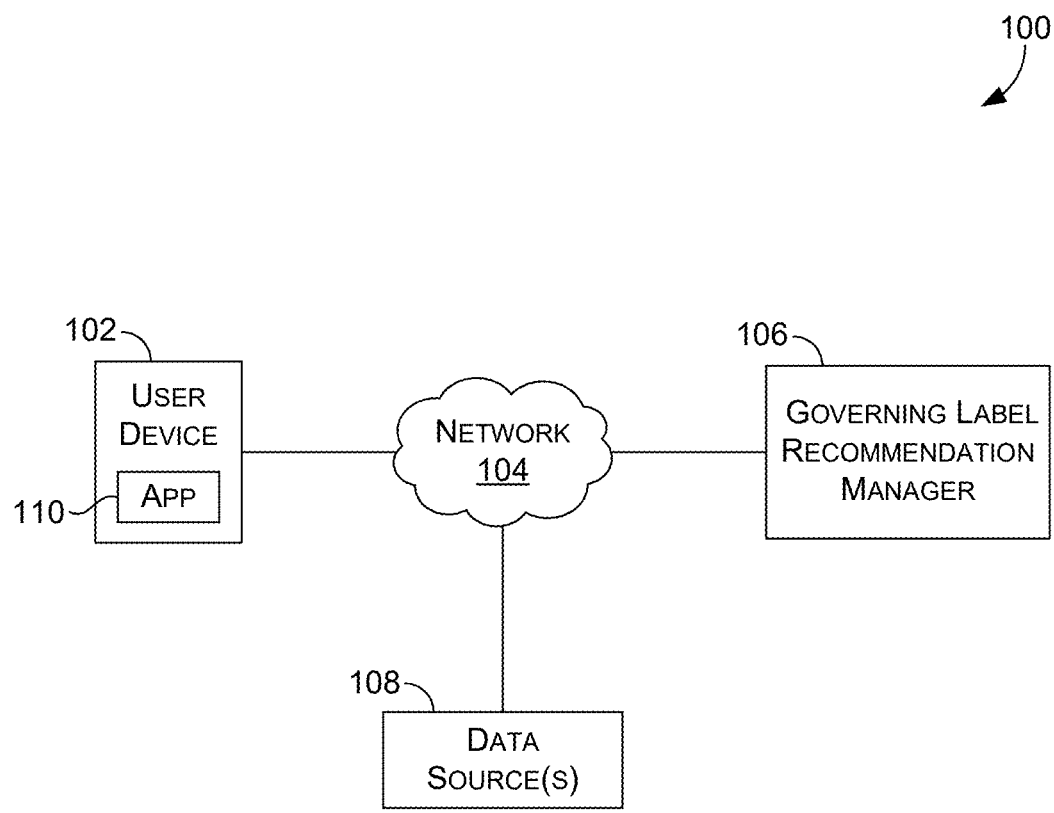
FIG. 1 depicts a diagram of an environment in which one or more embodiments of the present disclosure can be practiced, in accordance with various embodiments of the present disclosure.

Data management platforms store various data, oftentimes including enterprise customer data. The volume of data generated and stored, for example, by enterprises, is growing at an exponential scale. By way of example only, data generated based on customer activities on web portals, click-stream events, etc. continues to increase. With the increasing number of privacy regulations (e.g., GDPR), effective data governance is desired to ensure proper management, protection, and utilization of data. Managing data and ensuring proper governance, however, may be challenging due to the extensive amount of data, among other things.

One aspect of data governance includes assigning governing labels to data. A governing label generally refers to a particular type of label or tag applied to data to indicate importance, sensitivity, and/or regulatory classification. Governing labels may guide how data is managed, protected, and used. In conventional implementations, a set of governing labels are generally defined over a dataset as the data is uploaded to a data management platform. For example, a data steward or user of an enterprise may define governing labels in association with uploading or providing the data to the data management platform. The governing labels may be provided at the dataset level and/or attribute level. The governing labels may indicate, for instance, the presence of sensitive data, a type of downstream action that may be allowed on the data, presence of data that contain identifiable information, presence of sensitive data, rules origination from contractual obligations, etc. To manually apply or assign governing labels, the data stewards generally require a deep understanding of the content of the data and legal relevance of the data such that the appropriate governing label(s) is assigned for the dataset or dataset columns. Appropriate or correct governing labels are important to restrict the usage or access of the data as required. However, given the extensive volume of data ingested (e.g., by number and size of the datasets), the manual process of assigning governing labels is not scalable and is error prone.

In some cases, data discovery has been performed to infer the type of column attributes in datasets. To do so, the data content, such as data column content, is generally analyzed. Analyzing data content to perform data domain discovery, however, is resource intensive. For example, to analyze various sets of data columns of a dataset to infer a data domain associated with the corresponding data column utilizes an extensive amount of computing resources to process and analyze the data, particularly as the scale of data increases (e.g., by number and/or size of the datasets). In addition to the extensive amount of computing resource usage to perform such analysis, the analysis may not be feasible in many cases. For example, examining data contents may not be permitted due to privacy and/or access restrictions on enterprise data.

Accordingly, embodiments described herein are directed to facilitating governing label recommendations for data in an efficient and effective manner. In particular, recommendations for governing labels are automatically generated for data attributes without examining the data content (e.g., data column contents). To do so, and at a high level, a schema, or attribute level hierarchical path of an attribute, is used to predict a governing label relevant to a set of data. In some cases, governing label recommendations may be provided for data attributes or columns missing label information. In other cases, governing label recommendations may be provided for various data attributes of a dataset (e.g., each data attribute). A data attribute generally refers to a specific characteristic or property of a data entity. Generally, a data attribute is represented as a column in a dataset, with each column containing values corresponding to a specific attribute for each data record or entity. Data attributes can be various types of data, such as numerical data, categorical data, textual data, temporal data, spatial data, etc.

In operation, and at a high level, an input schema, for example, in the form of a hierarchical path of an attribute belonging to a tabular dataset, may be provided as input to a governing label recommendation manager (e.g., of a data management platform). Using the input schema, a set of governing labels may be predicted for data. A governing label may refer to a label or designation that indicates authority or control over a particular aspect of data. For instance, a governing label may indicate rules, regulations, or standards associated with a dataset, or portion thereof (e.g., a data attribute).

In some cases, a governing label recommendation manager includes a multilabel classifier that is used to predict a governing label(s) for data (each attribute). In embodiments, to enhance the governing label predictions, a label feature(s) may be used. In this way, a label feature may be used to facilitate a more accurate or suitable governing label prediction(s) for data. A label feature generally refers to an attribute, characteristic, property or quality of a label. One example of a label feature that is used to enhance governing label predictions is rich textual information. In particular, label descriptions that textually describe corresponding labels may be used to enhance identification of governing label predictions. Another example of a label feature that is used to enhance governing label predictions is label-co-occurrence. In this regard, a co-occurrence graph indicating co-occurrences of governing labels may be generated and used to improve prediction of governing labels. In accordance with predicting a governing label(s), the predicted label(s), or a portion thereof, may be provided as a recommendation(s) to define a downstream data governance rule. As an example, assume the governing label recommendation is generated that recommends a first label and a second label for a particular attribute of a dataset. In such a case, the first label and the second label may be assigned to the particular attribute for use in managing subsequent use and access of data associated with the attribute.

Advantageously, providing governing label recommendations as described herein provides an efficient and effective manner for identifying and/or applying governing labels to a dataset, or portion thereof. In particular, as embodiments described herein accurately identify governing labels in an automated manner, computing resources usage to correct for erroneous governing labels (e.g., erroneously identified by humans) is minimized. Further, computer resources usage for manually applying or tagging the data is minimized using embodiments described herein. Moreover, as embodiments described herein are performed without necessitating analysis of the data content, computing resource usage is significantly reduced, as data content analysis can impose a significant burden on computing and network utilization.

Although embodiments are generally described herein in relation to governing labels, such implementations can be performed in association with any type of labels that may be assigned to data. Further, although various artificial intelligence and machine learning technologies are included herein to provide examples, as can be appreciated, various other current and/or future technologies may be employed to perform functionality described herein.

Overview of Exemplary Environments of Facilitating Governing Label Recommendations for Data Turning to the figures, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 9.

It should be understood that operating environment 100 shown in FIG. 1 is an example of one suitable operating environment. Among other components not shown, operating environment 100 includes a user device 102, application 110, network 104, and a governing label recommendation manager 106. Operating environment 100 also shows data sources 108 that provide or store various data, for example, for which to provide governing label recommendations. Each of the components shown in FIG. 1 can be implemented via any type of computing device, such as one or more of computing device 900 described in connection to FIG. 9, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual or entity interested in initiating generation and/or viewing of governing labels recommendations. For example, in some implementations, such devices are the type of computing device described in relation to FIG. 9. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice.

Application 110 operating on user device 102 can generally be any application capable of facilitating the generation and/or presentation of governing label recommendations. In embodiments, the application 110 may be used to initiate generation and/or presentation of governing label recommendations. For instance, an individual or entity may select, via application 110, to initiate generation and/or presentation of governing label recommendations. In some cases, the user may select a dataset(s) for which to generate and/or present governing label recommendations. For instance, the application 110 may present a user interface that enables an individual to select any number of datasets (e.g., from data source 108) for which to generate governing label recommendations. Further, in some cases, the application 110 may enable a user to select attributes or columns of a dataset for which to generate governing label recommendations. For example, a user may select to generate governing label recommendations for each attribute in a dataset. As another example, a user may select to generate governing label recommendations for a portion of attributes in a dataset (e.g., attributes that are void of any corresponding labels).

In addition to selecting a dataset(s) and/or an attribute(s) for generating governing label recommendations, application 110 may facilitate other aspects associated with generating and/or presenting governing label recommendations. As one example, application 110 may enable a user to select or input a label set, or portion thereof, for use in generating governing label recommendations (e.g., as a candidate set of labels for assigning to data). A label set may refer to a set of data indicating labels. As one example, a label set may include a set of labels, a set of label names, and/or a set of label descriptions. One example of a label set is provided in FIG. 3, which includes labels 302, label names 304, and label descriptions 306. Although the label set is provided various such data, more or less data may be included in a label set (e.g., only labels may be provided).

As another example, application 110 may enable a user to select or input a preferred label feature to use in performing generation of governing label recommendations. For instance, a user may select to use label descriptions or label co-occurrences in generating governing label recommendations. As yet another example, application 110 may enable a user to select a preference of an action to take in association with the governing label recommendation and/or data to present in association with governing label recommendations. For instance, a user may select to automatically apply the governing label recommendations to the dataset. Alternatively, a user may select to present the governing label recommendations for confirmation to apply the governing label recommendations or selection to apply particular governing label recommendations to the dataset. A user may also select presentation attributes for the governing label recommendations, such as a particular number or threshold probability of governing label recommendations to view for a dataset, an attribute, etc.

In some implementations, the application 110 comprises a web application, which can run in a web browser, and could be hosted at least partially server-side (e.g., via a data management platform). In addition, or instead, the application 110 can comprise a dedicated application. In some cases, the application 110 is integrated into the operating system (e.g., as a service). It is therefore contemplated herein that "application" be interpreted broadly.

User device 102 can be a client device on a client-side of operating environment 100, while governing label recommendation manager 106 can be on a server-side of operating environment 100. Governing label recommendation manager 106 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or governing label recommendation manager 106 to remain as separate entities.

At a high level, the governing label recommendation manager 106 performs various functionalities to facilitate efficient and effective generation of governing label recommendations. The governing label recommendation manager 106 can communicate with application 110 in order for application 110 to facilitate initiation of generating governing label recommendations and, in some cases, presenting the governing label recommendations via a display screen of the user device 102.

In operation, an input schema, for example, in the form of a hierarchical path of an attribute belonging to a tabular dataset, may be provided as input to the governing label recommendation manager 106. Using the input schema, a set of governing labels may be predicted for data. In some cases, a governing label recommendation manager 106 includes a multilabel classifier that is used to predict a governing label(s) for data (each attribute). In embodiments, to enhance the governing label predictions, a label feature(s) may be used. In this way, a label feature may be used to facilitate a more accurate or suitable governing label prediction(s) for data. One example of a label feature that may be used to enhance governing label predictions is rich textual information. In particular, label descriptions that textually describe corresponding labels may be used to enhance identification of governing label predictions. Another example of a label feature that may be used to enhance governing label predictions is label-co-occurrence. In this regard, a co-occurrence graph indicating co-occurrences of governing labels may be generated and used to improve prediction of governing labels. In accordance with predicting a governing label(s), the predicted label(s), or a portion thereof, may be provided as a recommendation(s) to assign to a dataset, or portion thereof (e.g., an attribute). As an example, assume the governing label recommendation is generated that recommends a first label and a second label for a particular attribute of a dataset. In such a case, the first label and the second label may be assigned to the particular attribute for use in managing subsequent use and access of data associated with the attribute. The governing label recommendation may be stored (e.g., in data store 214 of FIG. 2).

The governing label recommendation manager 106 can be or include a server, including one or more processors and one or more computer-readable media. The computer-readable media includes computer-readable instructions executable by the one or more processors. The instructions can optionally implement one or more components of the governing label recommendation manager 106, described in additional detail below with respect to the governing label recommendation manager 206 of FIG. 2. In embodiments, the governing label recommendation manager 106 may be a part of, or communicate with, a data management platform.

For cloud-based implementations, the instructions on the governing label recommendation manager 106 can implement one or more components, and application 110 can be utilized by a user to interface with the functionality implemented on the governing label recommendation manager 106. In some cases, application 110 comprises a web browser. In other cases, the governing label recommendation manager 106 may not be required. For example, the components of the governing label recommendation manager 106 may be implemented completely on a user device, such as user device 102. In this case, the governing label recommendation manager 106 may be embodied at least partially by the instructions corresponding to application 110.

Thus, it should be appreciated that the governing label recommendation manager 106 may be provided via multiple devices arranged in a distributed environment that collectively provide the functionality described herein. Additionally, other components not shown may also be included within the distributed environment. In addition, or instead, the governing label recommendation manager 106 can be integrated, at least partially, into a user device, such as user device 102. Furthermore, the governing label recommendation manager 106 may at least partially be embodied as a cloud computing service.

Figure 2:
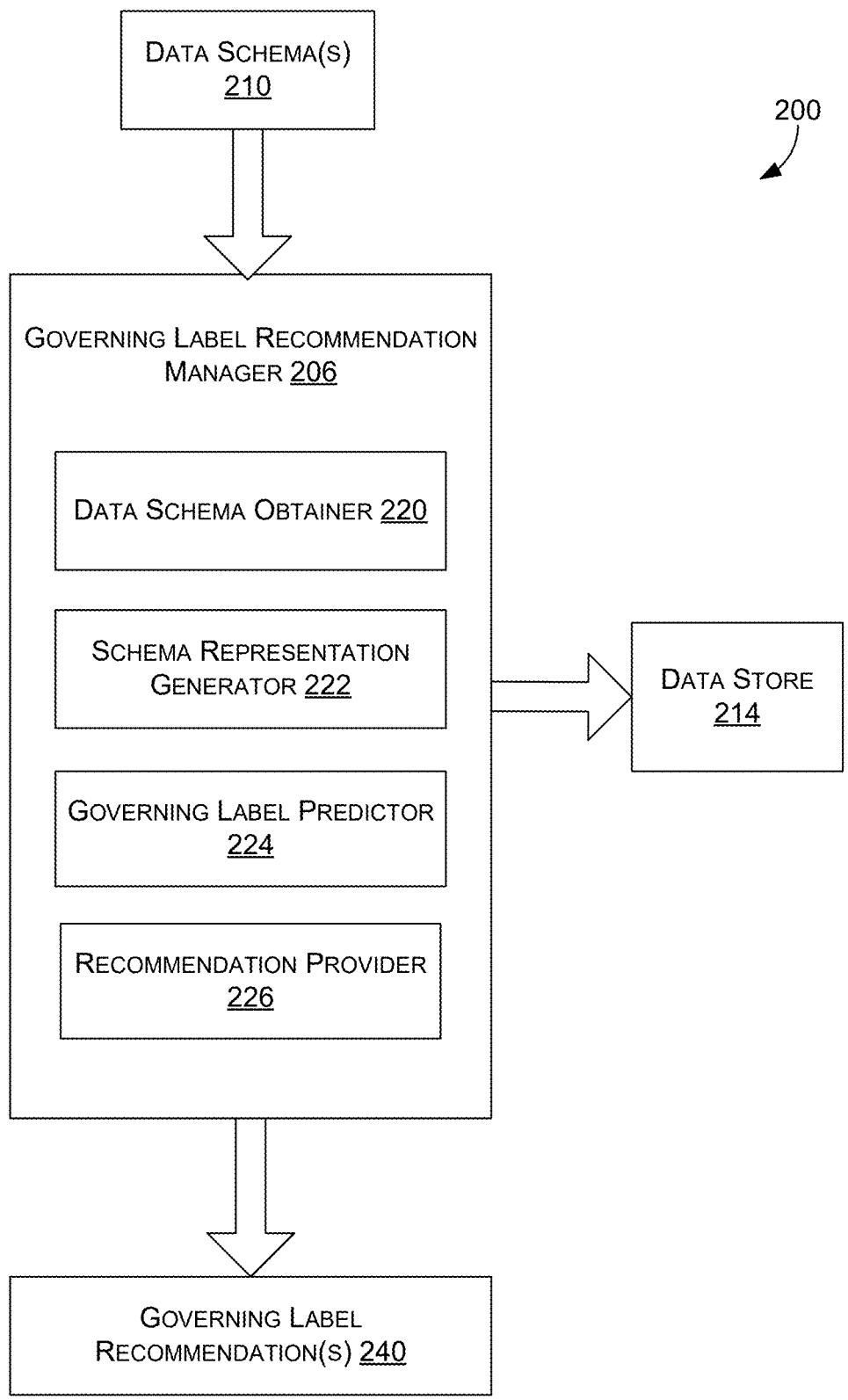
FIG. 2 depicts an example configuration of an operating environment in which some implementations of the present disclosure can be employed, in accordance with various embodiments of the present disclosure.

Referring to FIG. 2, aspects of an illustrative governing label recommendation manager 206 is shown, in accordance with various embodiments of the present disclosure. At a high level, the governing label recommendation manager 206 facilitates efficient and effective generation and/or presentation of governing label recommendations. Any number or combination of components can be used to employ functionality described herein in relation to the governing label recommendation manager and need not be limited herein.

In operation, the governing label recommendation manager 206 is generally configured to obtain a data schema associated with a dataset and, thereafter, use the data schema to predict (e.g., via machine learning) governing labels for data attributes associated with the dataset. Thereafter, a governing label recommendation(s) 240 may be output from the governing label recommendation manager 206 to recommend a governing label(s) for a data attribute(s). The governing label recommendation(s) 240 may be provided to a user device for display to a user (e.g., to view and/or confirm application to the dataset). Alternatively or additionally, the governing label recommendation(s) 240 may be automatically applied to the dataset (e.g., via a data management platform). In this way, a set of data attributes of a dataset may be labeled with the corresponding governing label recommendation. For example, assume a first set of governing labels are recommended for a first data attribute of a dataset and a second set of governing labels are recommended for a second data attribute of a dataset. In such a case, each label of the first set of governing labels may be applied to or used to tag the first data attribute of the dataset. Similarly, each label of the second set of governing labels may be applied to or used to tag the second data attribute of the dataset.

The governing label recommendation manager 206 may include any number of components to perform functionalities described herein. In one embodiment, the governing label recommendation manager 206 includes a data schema obtainer 220, a schema representation generator 222, a governing label predictor 224, and a recommendation provider 226. Such components can operate to generate a governing label recommendation(s), which can thereafter be presented and/or applied to the corresponding data as a label.

The data schema obtainer 220 is generally configured to obtain data schemas that may be used for generating governing label recommendations. A data schema generally refers to an organization, format, and/or relationship associated with data in a dataset. A data schema may include indications or definitions for tables, attributes or columns, data types, constraints, and/or other relevant metadata. Data schemas may be represented using various formal languages or formats, such as Structured Query Language (SQL), JavaScript Object Notation (JSON), extensible Markup Language (XML), etc.

In some cases, a data schema may include metadata in a hierarchical or tree schema format, such as an attribute-level hierarchical path. Examples of such metadata include:

/properties/directMarketingAddress/properties/stateProvince

/properties/homeAddress/properties/postalCode

In some embodiments, the data schema includes names of the attributes (e.g., columns) of a dataset. For example, the data schema may be a string of the column names, such as all column names in the dataset. The data schema may be a path or hierarchical route to an attribute in the dataset (e.g., in a tree structure).

In some embodiments, the data schema obtainer 220 obtains an indication of an attribute for which governing labels are desired to be predicted. For example, for a particular dataset, governing label recommendations may be generated for a particular attribute. In this way, the data schema obtainer 220 may obtain an indication of a particular attribute for which to generate a governing label recommendation. In some cases, an attribute for which to generate a governing label recommendation may be selected by a user (e.g., via a user interface of a user device). In other cases, an attribute for which to generate a governing label recommendation may be automatically selected, for example, by the data schema obtainer 220. For instance, the data schema obtainer may identify an attribute not having a governing label corresponding thereto. As another example, the data schema obtainer 220 may select each attribute of a dataset, for instance, in a sequential manner. For instance, a first attribute may be initially selected for generating governing label recommendations. Upon (or concurrently) generating a governing label recommendation for the first attribute, a second attribute may be selected for generating a governing label recommendation, and so on.

In cases in which a governing label recommendation is being generated for a particular attribute of a dataset, the data schema for the dataset (e.g., column names for each column in the dataset) can be used. Advantageously, using the data schema for the dataset provides enhanced context for governing label prediction. For example, a column name may exist titled "Year." Without additional context, the column name may refer to a wide variety of data types, such as birth year, publishing year, or subscription year. If an entire path is used and contains a category of "Personal Details," the "Year" has more context such that it can be recognized to be a birth year for the particular attribute.

The data schema obtainer 220 may obtain a data schema 210 for a dataset, or in association with a particular attribute thereof, in any number of ways. As one example, a user may input or select a data schema. As another example, a dataset may be obtained or accessed and the data schema may be obtained or accessed in association therewith. For example, a user may select a particular dataset for which to generate governing label recommendations. Based on the selected dataset, the data schema obtainer 220 may access the dataset and/or corresponding metadata (e.g., from a data store, such as data store 214), and obtain a corresponding data schema.

In some cases, the data schema obtainer 220 may preprocess data schema for subsequent analysis. As one example, a data schema may be preprocessed to remove certain characters, words, phrases, etc. For instance, the data schema may be analyzed to remove special characters, such as "/" and template words, such as "properties." Named entities (e.g., company names) may also be removed if present in a data schema path.

The schema representation generator 222 is generally configured to generate a representation of the data schema. In embodiments, a representation of the data schema is in the form of an embedding or contextual embedding. In this regard, the schema representation generator 222 can generate an embedding or contextual embedding in association with a data schema (e.g., embed data schema string to another space). As embeddings encode semantic information about words, phrases, etc. in a vector space (e.g., dense, continuous vector space), such embeddings enable understanding and language processing based on meaning as opposed to only raw text. In addition, as embeddings generally have lower dimensionality, the data is more manageable for efficient downstream tasks, such as classification.

The schema representation generator 222 may include any type of technology suitable to generate an embedding or contextual embedding for a data schema. As one example, Bidirectional Encoder Representations from Transformers (BERT) may be used to generate contextual embeddings. In this way, the representation of each word or token may vary depending on its context within the input sequence, thereby enabling capturing of nuanced semantic information and handling of tasks that require understanding of language in context.

The schema representation generator 222 (e.g., in the form of BERT) may be trained or fine-tuned to facilitate embedding of data schemas. In some cases, the schema representation generator 222 may be fine-tuned in association with the governing label predictor 224, or a classifier. In this way, a model may be trained by jointly tuning BERT with a classifier layer. For example, BERT may be fine-tuned for specific downstream tasks with task-specific classifiers. In this fine-tuning approach, additional task-specific layers are added on top of BERT's pre-trained architecture and the entire model is trained on labeled task-specific data. In embodiments, to train or fine-tune the schema representation generator 222, example dataset and corresponding example labels may be used.

The governing label predictor 224 is generally configured to predict governing labels for a dataset, or an attribute associated therewith. In this way, for a particular attribute of a dataset, the governing label predictor 224 may predict one or more labels. As an attribute may have multiple labels, the governing label predictor 224 may predict any number of labels for an attribute. Predicted governing labels may be stored, for example, in data store 214 in association with the dataset, or a portion thereof (e.g., metadata, schema, etc.).

In some embodiments, to predict governing labels, the governing label predictor 224 may be, or include, a classifier. A classifier generally refers to a type of machine learning model that takes input data and assigns it to one or more predefined categories or classes based on patterns or features in the data. In particular, a governing label predictor 224 may take a schema representation (e.g., in the form of an embedding) and output one or more governing labels to assign to a data attribute, or dataset associated therewith. In accordance with some embodiments described herein, the governing label predictor 224 may be, or include, a multi-class classifier. A multiclass classifier generally classifies input data into one or more multiple categories or classes. In this regard, the classes may be defined by, or represent, various governing labels. For example, assume five governing labels are candidate labels for which to assign an attribute. In such a case, a multiclass classifier may output a prediction or classification label indicating the governing label(s) to which the data attribute should be assigned. As can be appreciated, in embodiments, any number of governing labels may be assigned to the data attribute. In addition to a predicted governing label(s), additional information may also be output, such as confidence scores or probabilities associated with each class or label, thereby indicating a confidence in the corresponding prediction. Although embodiments generally describe using a multiclass classifier, other implementations may be used. For example, binary classifiers, probabilistic classifiers, or other machine learning or artificial intelligence technology may be used to predict governing labels.

In some embodiments, the governing label predictor 224 (e.g., in the form of a classifier) may be trained. At a high level, the model learns to map various features to corresponding classes through training. For example, a dataset (e.g., including column names) and corresponding governing labels (e.g., associated with various attributes of the dataset) may be used to train the governing label predictor 224. During training, a classifier may adjust its internal parameters or weights based on labeled examples to minimize prediction errors or loss. Various types of loss functions may be used to train a governing label predictor 224 and may depend on the machine learning technology used to predict governing labels. One example loss function that may be used is binary cross-entropy loss. During training, the goal is generally to minimize the binary cross-entropy loss by adjusting the model's parameters (e.g., weights and biases) through optimization algorithms, such as gradient descent. In multiclass classification, binary cross-entropy loss can be adapted to handle multiple classes using one-vs-all or one-vs-one approach.

In embodiments, binary cross-entropy loss may be used for training, including jointly training a classifier along with BERT. As an example, the binary cross-entropy loss for multi-label classification with n classes can be defined with N representing the batch size, C representing the number of classes, and $y_{ij}$ representing the ground truth label of the ith sample for the jth class. In this case, $y_{ij}=1$ if the sample belongs to the jth class and $y_{ij}=0$ otherwise. Assume $p_{ij}$ represents the predicted probability of the jth sample belonging to the ith class according to the model. The binary cross-entropy loss $L_{BCE}$ for each class j is given by:

$$L_{BCE} = \frac{1}{C}\sum_{i=1}^{C} L_i$$

where $$L_i = -\frac{1}{N}\sum_{j=1}^{N}(y_{i,j}\log p_i + j + (1-y_{i,j})\log 1 - p_{i,j})$$

Binary cross-entropy loss is only one example that may be used. Other examples of loss functions include categorical cross-entropy loss and softmax cross-entropy loss.

In some embodiments, the governing label predictor 224 may include utilization of contrastive learning. For example, an embedding model may be improved through the use of supervised contrastive loss. Contrastive learning provides a technique used in machine learning to improve classification performance by enhancing separability of classes in the embedding space. This learned embedding space can then be utilized by various downstream tasks, such as classification. In the context of classification, contrastive learning facilitates creation of better representations of the input data, which in turn can enhance the performance of the classifier.

In some cases, a projection layer may be inserted between the generation of schema representations (e.g., embeddings) and the classifier labels. In contrastive learning, the objective is to learn a projection function which is able to project what are considered positive pairs, or similar data points, close to one another in an embedding space and push negative pairs, or dissimilar data points, away from one another in the projection space. In a supervised setting, ground truth labels can be used to generate the set of positive pairs. Two examples are considered positive if the examples share a label.

As an example, assume x, y∈X. and $L_x$, $L_y$ be the groundtruth label set for x, y respectively. (x, y) are a positive pair if and only if $|L_x \cap L_y|>0$. A pair in the batch which do not share any labels is a negative pair. Consider a batch B of training samples. Let B(i) refer to the ith sample in the batch B. Let P(i) denote the set of all indices of the samples in the batch B that constitute positive pairs to B(i), and A(i) denote set of indices that constitute negative pairs to B(i). In such a case, the contrastive projection layer is trained to minimize the contrastive loss:

$$L_{Con} = \sum_{i \in I} \frac{-1}{|P(i)|}\sum_{p \in P(i)} \log \frac{\exp\left(\frac{z_i * z_p}{\tau}\right)}{\sum_{a \in A(i)} \exp\left(\frac{z_i * z_a}{\tau}\right)}$$

where $z_i$ is the projection from the contrastive layer corresponding to the B(i). A linear classifier may be used on top of a contrastive projection layer, and the whole model may be trained with both the contrastive loss and classification loss (e.g., BCE loss) end to end.

Although use of contrastive learning is described in association with governing label predictor 224, contrastive learning may be performed in association with the schema representation generator 222, or other component.

Figure 4:
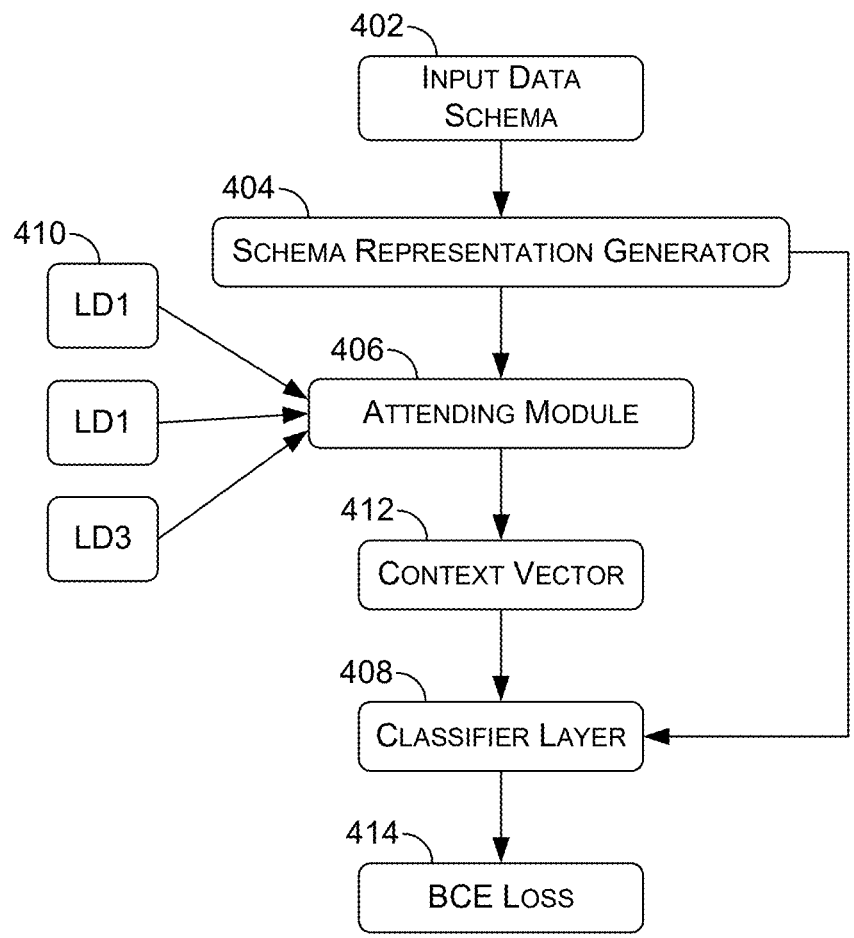
FIG. 4 provides an example implementation of using rich textual information to enhance governing label recommendation, in accordance with various embodiments of the present disclosure.
Figure 5:
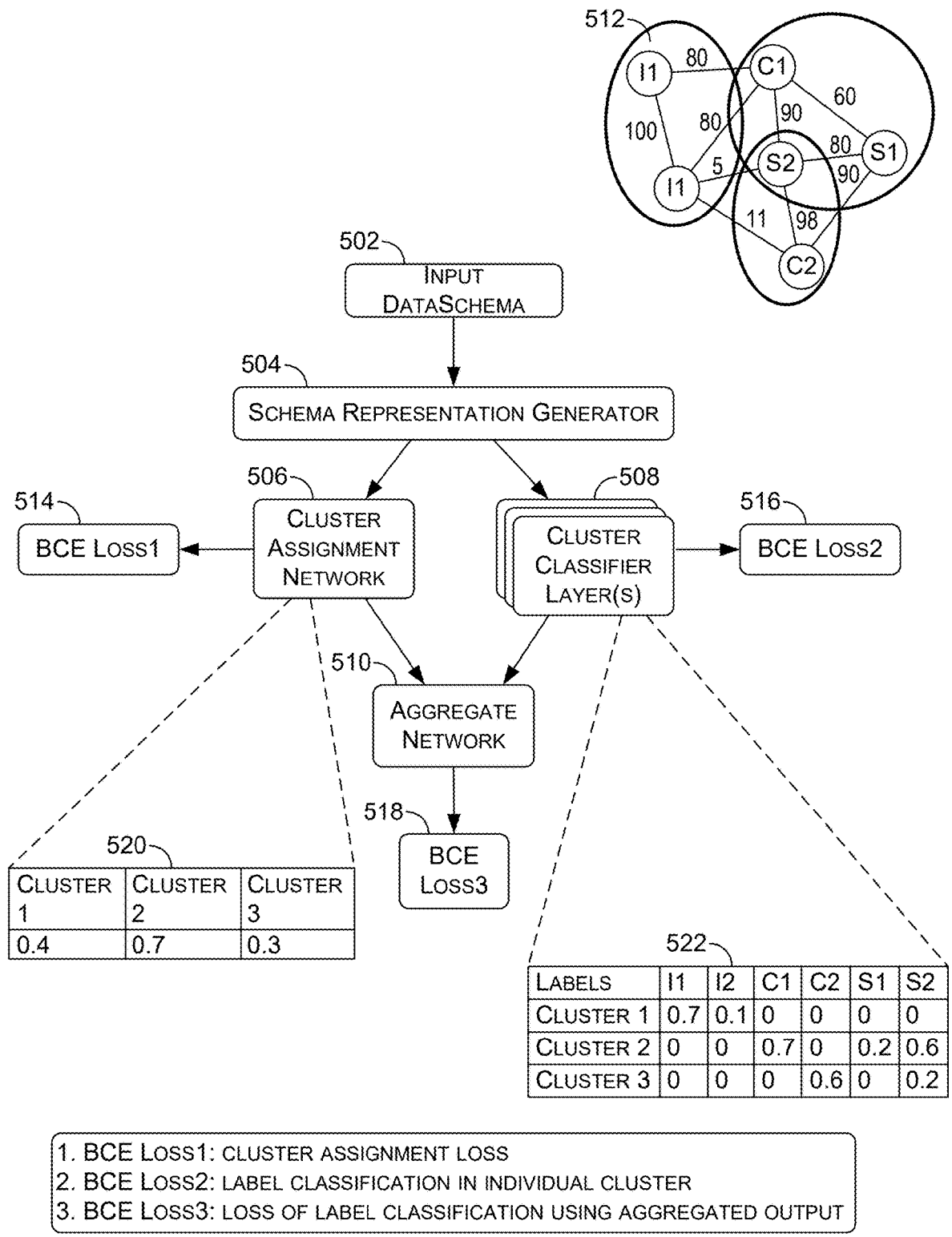
FIG. 5 provides an example implementation of using label co-occurrence to enhance governing label recommendations, in accordance with various embodiments of the present disclosure.

In accordance with embodiments described herein, the governing label predictor 224 may use label features to enhance prediction of governing labels. In particular, to enhance the governing label recommendations, a label feature(s) may be used. In this way, a label feature may be used to facilitate a more accurate or suitable governing label recommendation(s) for data. A label feature may refer to an attribute, characteristic, property or quality of a label. One example of a label feature that is used to enhance governing label recommendations is rich textual information (e.g., label descriptions associated with labels). FIG. 4, as discussed more fully below, provides an example implementation of using rich textual information to enhance governing label recommendations. Another example of a label feature that is used to enhance governing label recommendations is label-co-occurrence. FIG. 5, as discussed more fully below, provides an example implementation of using label co-occurrence to enhance governing label recommendations.

In accordance with predicting governing labels, the recommendation provider 226 is generally configured to provide a governing label recommendation(s) 240. A governing label recommendation provides a recommendation of a governing label for a dataset, or an attribute associated therewith. A governing label recommendation may recommend any number of governing labels. In some cases, a governing label recommendation(s) is provided to a user device to present to a user. For example, governing label recommendations may be provided to a user device in response to a user selection to view governing label recommendations for a dataset or a particular set of attributes of the dataset. In accordance with presenting a governing label recommendation(s), a user may view the recommendation and select to apply the governing label to the corresponding data attribute, or data associated therewith. Alternatively or additionally, a governing label indicated in a recommendation may be automatically applied to a dataset, or an attribute associated therewith. For example, assume a first governing label and a second governing label are provided as a recommendation for a particular attribute of a dataset. In such a case, the first governing label and the second governing label may be automatically applied to the particular attribute.

Turning to FIG. 4, FIG. 4 provides an example implementation of using rich textual information to enhance governing label recommendations. In particular, label descriptions associated with labels may be used to enhance governing label recommendations. A label description generally refers to a text description that indicates or specifies a manner in which data associated with the corresponding label may be used. FIG. 3 provides various examples of label descriptions 306 that correspond with labels 302 and label names 304. In operation, for a given input, embodiments described herein facilitate attending over a label description(s), thereby enabling focus on specific data that is deemed more relevant or important for a given task. To do so, an attending module or mechanism may be used to weight different aspects differently when making predictions or generating output.

As shown in FIG. 4, the input data schema 402 is obtained and provided as input to a schema representation generator

404. The schema representation generator 404 may generate a representation of the data schema, such as via an embedding or contextual embedding. The schema representation (e.g., in the form of a contextual embedding) is provided to the attending module 406 and the classifier layer 408. In accordance with FIG. 2, attending module 406 and classifier layer 408 may be included as part of the governing label predictor 224 of FIG. 2.

The attending module 406 is generally configured to generate attention weights for label descriptions. For example, for a set of label descriptions associated with labels (e.g., label descriptions 306 of FIG. 3), the attending module 406 may generate attention weights for each label description of the label description set. In this way, the attending module 406 facilitates identification of how much attention to give to various labels for a particular input data schema, such that more relevant label descriptions are more attended to than irrelevant label descriptions. Stated differently, attention weights for each label description for an input indicate weightage the label description should have in association with the input, such as input data schema 402. In some cases, the label descriptions may be in the form of embeddings (or other representation of the label description). For example, the schema representation generator 404 or other embedding generating component may generate embeddings (e.g., sentence embeddings) to represent label descriptions associated with candidate labels for the dataset, or a portion thereof.

As shown in FIG. 4, the label descriptions 410, including LD1, LD2, and LD3, are input into the attending module 406 for generating attention weights associated therewith. By way of example only, the attending module 406 may generate an attention weight $a_1$ for label description LD1, an attention weight $a_2$ for label description LD2, and an attention weight $a_3$ for label description LD3 in association with the input data schema 402. The attention weights, $a_1$, $a_2$, and $a_3$, may be used to generate a context vector 412. At a high level, the context vector 412 represents the attended information or context from the input data, emphasizing the portions that are most relevant or important. The context vector 412 is then provided along with the schema representation to the classifier layer 408 for classifying an attribute, or dataset associated therewith, in association with a governing label(s). As one example, a linear layer may be used to perform classification using context vector 412 and an embedding of a data schema. As shown, BCE loss 414 may be used for training and, in some cases, to jointly train the schema representation generator 404. In this way, the classifier layer 408 may be trained on BCE loss, as described herein.

By way of example only, assume E represents an embedding function. Given an attribute schema input $x \in X$, $e_x = E(x)$ can be computed. For all label descriptions $d_i \in D$, sentence embeddings $e_{d_i} = E(d_i)$ may be generated. Input x can be projected into query space using a linear transformation Q: $q = Q(e_x)$ (e.g., take $e_x$ and generate output projecting into query space). Description embeddings $e_{d_i}$ may be projected to the key space using linear transformation K: $k_i = K(e_{d_i})$. Thereafter, attentions scores $s_i$ may be generated as $s_i = q*k_i$. The attention scores may be normalized to generate attention weights $a_i$ as follows:

$$a_i = \frac{\exp(s_i)}{\sum_{j=1}^{n} \exp(s_j)}$$

Using the attention weights, the context vector u may be computed as:

$$u = \sum_{i=1}^{n} a_i e_{d_i}$$

With respect to FIG. 5, FIG. 5 provides an example implementation of using label co-occurrences to enhance governing label recommendations. In this regard, using label co-occurrence can be used to facilitate more accurate prediction of governing labels. For example, for certain labels that are similar in meaning and/or purpose, their co-occurrence is an approximate indicator of proximity (e.g., latent proximity). In some cases, using label co-occurrences may be used in addition to or in the alternative to attending to label descriptions. In operation, for a given input, embodiments described herein facilitate using hierarchical classification, for example, that models the underlying space of data labels as a graph (e.g. labels as nodes in the graph) to better exploit co-occurrence information. To do so, a hierarchical classification implementation may be used to identify a cluster(s) and individual labels within the cluster(s) for use in generating a final governing label prediction.

As shown in FIG. 5, the input data schema 502 is obtained and provided as input to a schema representation generator 504. The schema representation generator 504 may generate a representation of the data schema, such as via an embedding or contextual embedding. The schema representation (e.g., in the form of a contextual embedding) is provided to the cluster assignment network 506 and the cluster classifier layer(s) 508. An aggregate network 510 may then be used to aggregate the output of the cluster assignment network 506 and the cluster classification layer(s) 508 to generate a final governing label(s) prediction. Generally, the hierarchical classification model, including the cluster assignment network 506, the cluster classifier layer(s) 508 and the aggregate network 510, generally learns governing labels in a staggered or hierarchical manner. In this way, the model learns a suitable or appropriate cluster(s) that groundtruth labels belong to, then learns the correct labels for each input within each cluster and, thereafter, aggregates the learning across the clusters in a cluster membership aware manner. In accordance with FIG. 2, cluster assignment network 506, cluster classifier layer(s) 508, and aggregate network 510 may be included as part of the governing label predictor 224 of FIG. 2.

The cluster assignment network 506 is generally configured to identify a cluster(s) or subgraph(s) in association with the input data schema (e.g., in which class the input data scheme embedding belongs). As an example, assume a graph 512 is generated including three clusters of labels. The cluster assignment network 506 may identify or predict which cluster(s) corresponds with the input data schema. In some cases, probabilities or confidences may be generated in association with the clusters. For example, as shown at 520, the cluster assignment network 506 may identify cluster 1 as having 0.4 probability of being relevant, cluster 2 as having a 0.7 probability of being relevant, and cluster 3 as having a 0.3 probability of being relevant. In some cases, a particular cluster(s) is selected using a threshold-based assignment. For example, any cluster associated with a probability over a threshold probability (e.g., 0.5) may be identified in association with the input. In embodiments, the cluster assignment network 506 may be trained using BCE loss 514, as described herein. In this way, BCE loss may be used in an effort to minimize the loss to identify a correct cluster.

Training data to train the cluster assignment network 506 may include, for instance, training dataset with governing labels and constructed cluster graph (e.g., constructed via partition).

By way of example only, the cluster assignment network 506 may learn which clusters or subgraphs groundtruth labels belong to given the input embedding representing a data schema. Assume K+1 clusters exist, $F_a$ denotes the cluster assignment. Further assume X represents the set of all inputs and $e_x=E(x)$ is an embedding generated for input $x \in X$ using an embedding function E. In such a case, $F_a(e_x)=c \forall x \in X$, where c is binary vector $c \in \{0, 1\}^{K+1}$. In this example, c(i)=1 indicates i is a correct cluster for input x based on groundtruth labels. In embodiments, any number of clusters may be predicted. In on example, the loss used is BCE loss.

As can be appreciated, in embodiments, the cluster assignment network 506, or other component, may generate a co-occurrence graph 512. A co-occurrence graph models space of governing labels as a graph with governing labels as nodes in the graph and edge weights representing the frequency of co-occurrence of governing labels. A co-occurrence graph may be labeled in any number of ways. As one example, assume there are n labels: $L=\{l_1, l_2, \ldots, l_n\}$. A graph G is defined as G=(V, E) where V=L. The edge weight $w_{i,j}$ of the edge $e_{ij}$ between labels $l_i$ and $l_j$ is given by number of times the labels co-occur in the training set. Specifically, $\forall e_{ij} \in E$, $w_{ij}=f(l_i, l_j)$ where $f(l_i, l_j)$ is the count of co-occurrence between two labels in the training set.

After generating a cluster graph in the form of a co-occurrence graph, the clusters may be identified. A cluster is generally desired to include governing labels likely to co-occur with one another. Identifying clusters may be performed in any number of ways. In one approach, graph density based modeling may be used to identify dense clusters or subgraphs. At a high level, graph density based modeling may be used to identify a certain desired number of dense subgraphs from co-occurrence graph. In some cases, the subgraphs should be dense so that they capture the frequently occurring labels together. Further, the subgraphs may be desired to be diverse to capture unique combinations of frequently occurring labels and provide maximum coverage of the graph (e.g., all labels should be included in at least one subgraph). Further, to capture meaningful information, subgraphs may be of a desirable size—not too large or small. Upon identifying the desired sub-graphs, training may be performed in a hierarchical manner over the subgraphs to better discriminate between labels and predict multiple labels more effectively.

By way of example only, assume $s_{max}$ denotes a maximum size of desired subgraph and $s_{min}$ denotes the minimum size. Let K be the maximum number of desired clusters. For a total of |L| label nodes, $$\frac{|L|}{s_{max}} \leq K \leq \frac{|L|}{s_{min}}$$

Furthermore, to accomplish diverse clusters to capture different sets of labels, a threshold Th is selected, such that none of the chosen clusters have a fractional overlap of more than Th with one another, where the fractional overlap between two subgraphs g, g' is defined as $$\frac{|g \cap g'|}{\min(|g|, |g'|)}$$

In embodiments, a soft clustering over label co-occurrence graph allows nodes to belong to multiple clusters. The density of a subgraph $S \subset G$ may be defined as:

$$D_1(S) = \frac{\sum_{l_i \in S, l_j \in S} w_{ij}}{|S|}, \text{ or, } D_2(S) = 2\frac{\sum_{l_i \in S, l_j \in S} w_{ij}}{|S|(|S|-1)}$$

In this example, let G be the set of all subgraphs in the graph G, such that for any subgraph $g \in S$, $s_{min} \leq |g| \leq s_{max}$, and g is connected. $D_g$ denotes the density of a subgraph g. The goal of identifying the subgraphs can be expressed mathematically as follows by a integer linear program, which may be referred to as MAXDENSITY:

Maximize $\sum_{g \in G} D_g x_g$ s.t $$\sum_{g \in G} x_g \leq K$$

$$y_{i,g} = 0 \forall l_i \notin g, \forall i \in [n]$$

$$\sum_{g \in G} y_{i,g} \geq 1 \forall l_i \in V$$

$$x_g + x'_g \leq 1 \forall g, g' \text{ s.t. } \frac{|g \cap g'|}{\min(|g|, |g'|)} \geq Th, g, g' \in G$$

$$y_{i,g}, x_g \in \{0, 1\}$$

MAXDENSITY generally identifies high density clusters, while ensuring coverage of all labels and diversity in the choices. In MAXDENSITY, $x_g$ is an indicator variable whether subgraph g is chosen or not. $y_{i,g}$ is an indicator whether label $l_i$ is covered by cluster g, which is possible if $l_i$ is a part of g and g is a chosen subgraph. In some cases, an integer linear program may be described as follows:
  Objective function: Maximize the total density of chosen subgraphs.
  Constraint 1: The total number of chosen subgraphs should be at most K.
  Constraint 2: A label $l_i$ cannot be covered by a cluster or subgraph g if $l_i$ does not belong to the cluster g.
  Constraint 3: A label $l_i$ that belongs to a cluster g can be covered by g only if g is chosen, otherwise not.
  Constraint 4: All labels must be covered by at least one chosen cluster.
  Constraint 5: Only one among a pair of clusters g, g' can be chosen if their fractional overlap is ≥Th.

As described, density based soft clustering may be used to allow nodes to belong to multiple clusters. In one implementation, a list of subgraphs $g \in G$ is ranked by corresponding density $D_g$ in a non-increasing order. Such an ordered list may be presented as $L_T$. The list $L_T$ may be traversed to select a next subgraph or cluster. As one example, a next cluster may be selected by initializing the set of chosen subgraphs as $G_{ch} \leftarrow \emptyset$. The top most subgraph from $L_T$ is added to $G_{ch}$ and remove from $L_T$. Subsequent subgraphs are removed in the ordered list $L_T$ that have a fractional overlap ≥Th with the currently chosen set of subgraphs $G_{ch}$. The fractional overlap of a subgraph g with a chosen cluster $C_i$ is modified as $$\frac{|g \cap C_i|}{|g|}$$

because of the iterative greedy nature of the heuristic. The process continues until K clusters exist or until the end of the list is reached. If K is exhausted and there exist some label $l_i \in G$ such that $l_i$ does not belong to any cluster, all such $l_i$ are gathered and are used to form the (K+1)th cluster.

Turning to the cluster classifier layer(s) 508, the cluster classifier layer(s) 508 are generally configured to classify or identify a governing label(s) within a cluster that is applicable to a particular input, such as input schema. In this way, for each cluster prediction, the cluster classifier layer 508 may predict a governing label in the cluster for the input schema. As an example, assume a graph 512 is generated including three clusters of labels. The cluster classifier layers 508 may identify or predict which label(s) corresponds with the input data schema. In some cases, probabilities or confidences may be generated in association with the clusters. For example, as shown at 522, the cluster classifier layer(s) 508 may identify label I1 of cluster 1 as having 0.7 probability of being relevant, label I2 of cluster 1 as having a 0.1 probability of being relevant. For cluster 2, label C1 may be identified as having a 0.7 probability of being relevant, while label S1 and S2 are identified as having a 0.2 and 0.6 probability of being relevant, respectfully. For cluster 3, label C2 may be identified as having a 0.6 probability of being relevant and label S2 as having a 0.2 probability of being relevant. In some cases, a particular label(s) may be selected using a threshold-based assignment. For example, any label associated with a probability over a threshold probability (e.g., 0.5) may be identified in association with the input. A final governing label(s) for an input may be represented via a vector of 0s and 1s. In embodiments, the cluster classifier layer(s) 508 may be trained using BCE loss 516, as described herein. In this way, BCE loss may be used in an effort to minimize the loss associated with label classification in individual cluster.

In one example, assume $C_i$ denotes the ith cluster of the label nodes, $i \in [K+1]$, and $C=\{C_1, C_2, \ldots, C_{K+1}\}$ denotes the set of clusters. For each $C_i \in C$, assume there is a network $F_{Ci}$ which takes input embedding $e_x$ and predicts whether any of the labels $l_j \in C$, are the right labels for x. In this way, individual label prediction networks consists of $|C|=K+1$ separate networks. Let $r_i$ denote $F_{Ci}(e_x) \in \{0, 1\}^n$, (n being the total number of labels). $r_i(j)$ is considered if the jth label belong to ith cluster and, if not, a mask is applied. In particular, a masking matrix M of dimension n×(K+1) is defined by initializing $M_{i,j}=0 \forall_i \in [n], \forall j \in [K+1]$. For all (i, j) such that $l_i \in C_j$, the matrix entry is set to 1 as $M_{i,j}=1 \forall l_i \in C_j$. The individual label prediction network F(b) is obtained by a pointwise (or, element wise) matrix multiplication of matrices of dimension n×(K+1) as follows: Fb(ex)=M⊙([FC1, FC2, . . . , FCk+1](ex)).

With reference to the aggregate network 510, the aggregate network is generally configured to aggregate outputs of the cluster assignment network 506 and the cluster classifier layer(s) 508 and output a governing label(s) prediction. In this way, the aggregate network 510 generates a final governing label prediction(s). The aggregate network 510 may be a linear layer, in accordance with one embodiment described herein. One example representation is as follows:

$$F_c(F_a(x), F_b(x)) = F_c(c, [r_1, r_2, \ldots, r_{k+1}]) = v$$

where $v \in \{0, 1\}^n$ is the final label prediction. More specifically, c and $[r_1, r_2, \ldots r_{k+1}]$ are combined to generate a vector $z=[r_i \| c_1 \| r_2 \| c_2 \| \ldots r_{k+1} \| c_{k+1}]$ which is passed to the linear layer trained, for example with BCE loss 518. For instance, the aggregate network 510 may train for loss of label classification using aggregated output.

Figure 6:
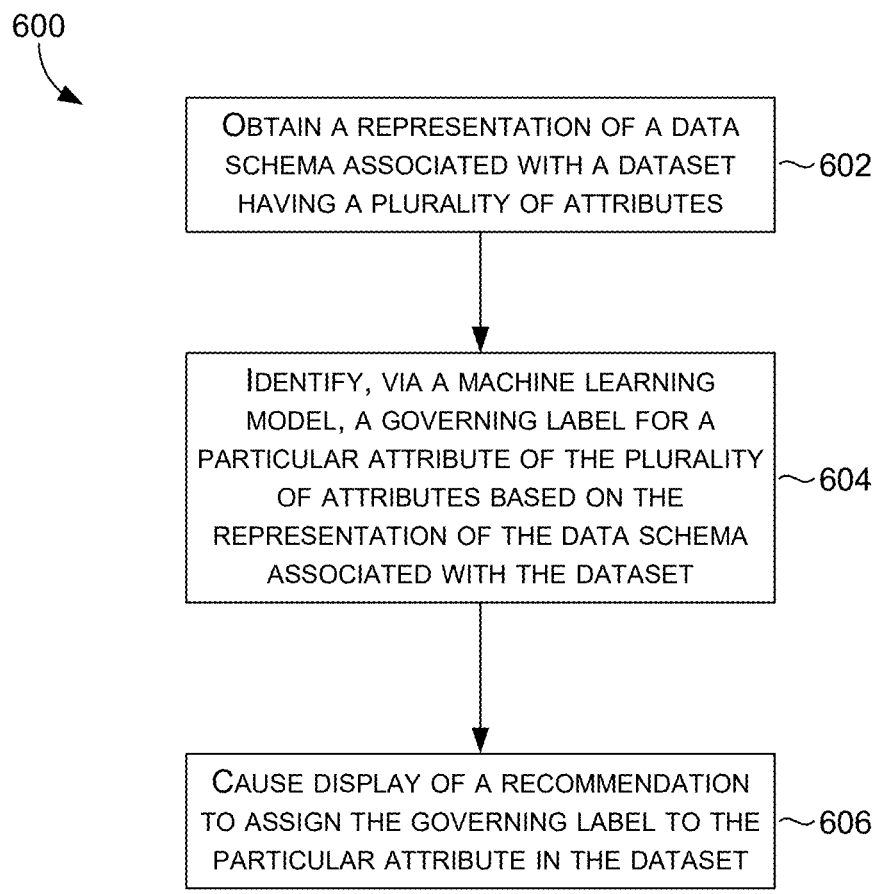
FIG. 6 is a process flow showing a method for facilitating generation and presentation of governing label recommendations for data, in accordance with embodiments of the present disclosure.
Figure 7:
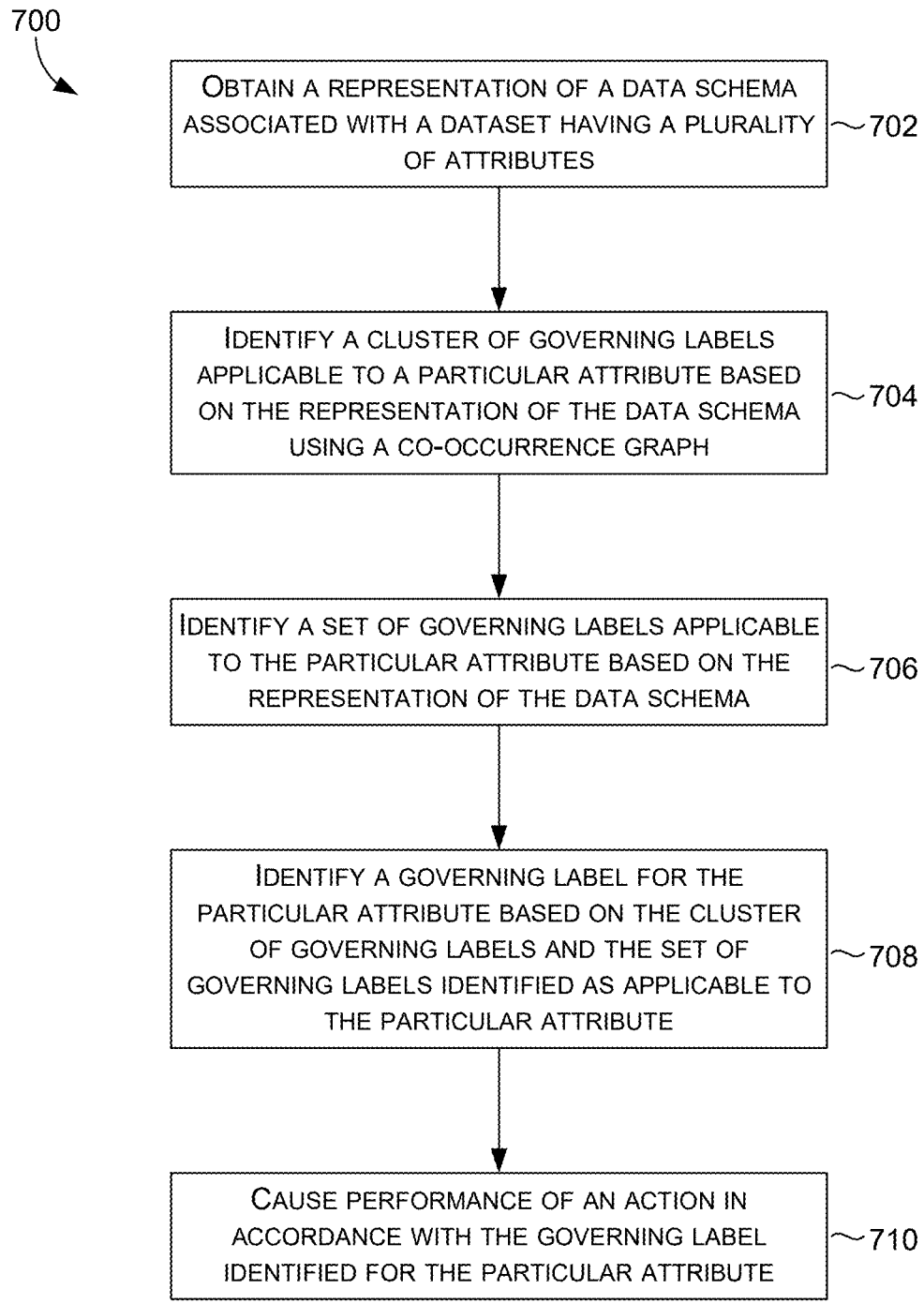
FIG. 7 is a process flow showing another method for facilitating generation and presentation of governing label recommendations for data, in accordance with embodiments of the present disclosure.
Figure 8:
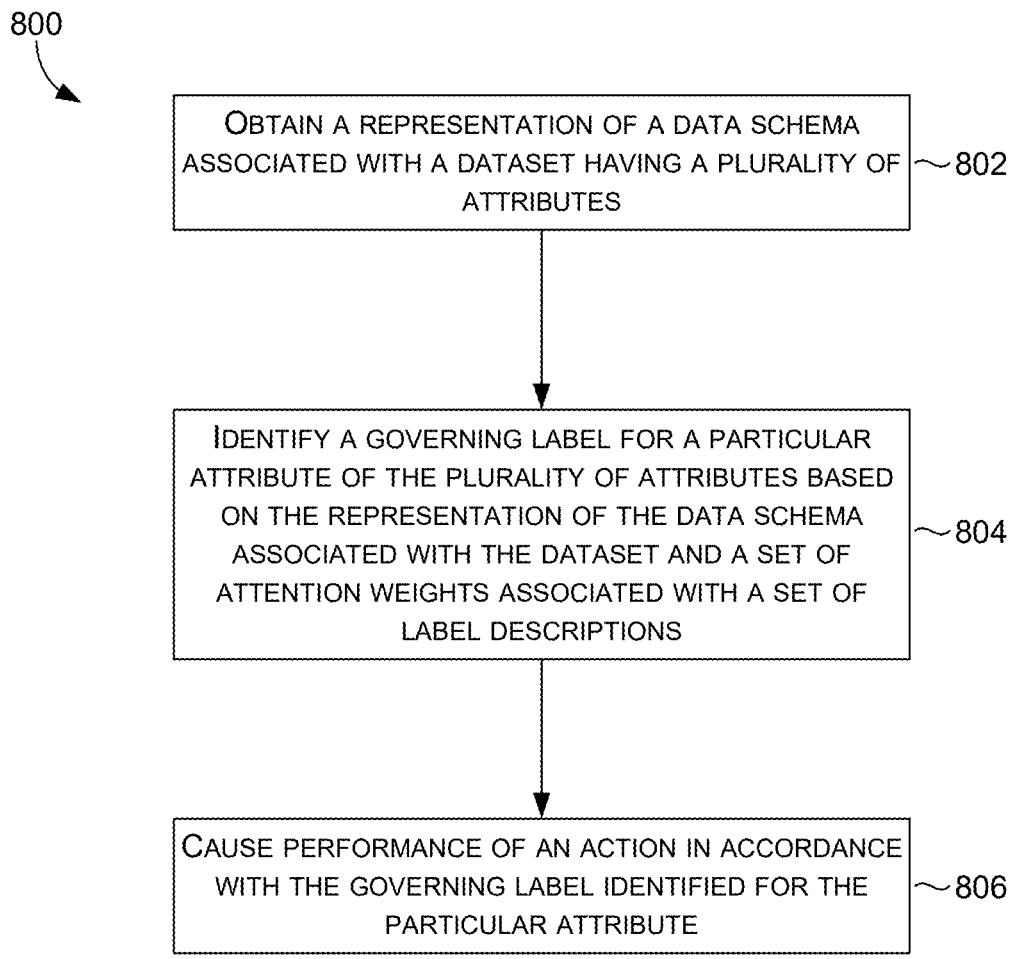
FIG. 8 is a process flow showing another method for facilitating generation and presentation of governing label recommendations for data, in accordance with embodiments of the present disclosure.

Exemplary Implementation of Facilitating Governing Label Recommendations for Data With reference now to FIGS. 6-8, FIGS. 6-8 provide method flows related to facilitating generation and/or presenting of governing label recommendations for data, in accordance with embodiments of the present technology. Each block of method 600, 700, and 800 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 6-8 are exemplary only and not intended to be limiting. As can be appreciated, in some embodiments, method flows 600-800 can be implemented, at least in part, to facilitate effective and efficient generation of governing label recommendations.

Turning initially to FIG. 6, a flow diagram is provided showing an embodiment of a method 600 for facilitating generation and presentation of governing label recommendations for data (e.g., attributes associated with a dataset), in accordance with embodiments described herein. A governing label recommendation(s) can be used to apply a governing label(s) to a dataset, or portion thereof (e.g., an attribute).

Initially, at block 602, a representation of a data schema associated with a dataset having a plurality of attributes is obtained. In embodiments, a representation of a data schema may be an embedding (e.g., a contextual embedding). The representation of the data schema may be generated in a number of ways. As one example, a representation of a data schema may be generated using a set of column names that correspond with the dataset.

At block 604, a governing label for a particular attribute of the plurality of attributes is identified, via a machine learning model, based on the representation of the data schema associated with the dataset. In one embodiment, a multiclass classifier is used to identify probabilities associated with various candidate governing labels to apply to the particular attribute. Based on the probabilities associated with the various candidate governing labels, one or more governing labels may be identified as relevant to the particular attribute. The particular attribute for which the governing label is identified may be selected or identified in any number of ways. As one example, the particular attribute may be one of the plurality of attributes selected in a sequential order (e.g., each attribute is progressively selected). As another example, the particular attribute may be selected by a user desiring to view recommendations of governing label for the attribute. As yet another example, the particular attribute may be identified as being unassociated with any governing labels and, as such, be identified for generating governing label recommendations associated therewith.

In some embodiments, a label feature(s) may be used along with the representation of the data schema to identify a governing label for a particular attribute. As one example, the machine learning model may use a set of attention weights associated with a set of label descriptions to identify a governing label for the particular attribute. For example, assume a multiclass classifier analyzes over a set of candidate governing labels. Further assume each candidate governing label corresponds with a label description. In such a case, attention weights may be generated in association with the label descriptions for use in identifying a governing label suitable for the particular attribute.

As another example, co-occurrence data associated with labels may be used to identify a governing label for a particular attribute. In one example implementation, a co-occurrence graph may be generated, wherein nodes represent governing labels and edges represent frequencies of co-occurrence between the corresponding governing labels. Various clusters of labels may be identified, with each cluster including labels likely to co-occur with one another. A particular cluster(s) may then be identified as applicable to the representation of the data schema and, for the particular cluster(s), a governing label(s) within the particular cluster may be identified as applicable to the representation of the data schema. Identification of the cluster and the governing label can then be used to identify a governing label for the particular attribute At block 606, a recommendation to assign the governing label to the particular attribute in the dataset is displayed. In some embodiments, the recommendation is provided to a user device for display to a user. The user may view the recommendation and select or confirm to apply the governing label to the particular attribute.

Turning now to FIG. 7, a flow diagram is provided showing an embodiment of a method 700 for facilitating generation and presentation of governing label recommendations for data (e.g., attributes associated with a dataset), in accordance with embodiments described herein.

Initially, at block 702, a representation of a data schema associated with a dataset having a plurality of attributes is obtained. In embodiments, a representation of a data schema may be an embedding (e.g., a contextual embedding). The representation of the data schema may be generated in a number of ways. As one example, a representation of a data schema may be generated using a set of column names that correspond with the dataset.

At block 704, a cluster of governing labels applicable to a particular attribute is identified based on the representation of the data schema using a co-occurrence graph. In embodiments, the co-occurrence graph includes nodes representing governing labels and edges representing frequencies of co-occurrence between corresponding governing labels. In embodiments, the co-occurrence graph is analyzed to identify clusters of labels, with each cluster including governing labels likely to co-occur with one another.

At block 706, a set of governing labels applicable to the particular attribute is identified based on the representation of the data schema. In this way, for an identified cluster of labels, the governing labels associated therewith are analyzed to identify one or more governing labels applicable to the particular attribute.

At block 708, a governing label for the particular attribute is identified based on the cluster of governing labels and the set of governing labels. In this regard, the cluster of governing labels and the set of governing labels may be aggregated and analyzed to identify a governing label(s) applicable to the particular attribute.

At block 710, an action is caused to be performed in accordance with the governing label identified for the particular attribute. In one embodiment, the governing label is presented, via a user interface, as a recommended governing label for the particular attribute. In another embodiment, the governing label is automatically assigned to the particular attribute. In this way, the particular attribute, and/or data associated therewith, may be automatically tagged with the governing label. Based on the governing label being applied to the particular attribute, the dataset, or the particular attribute and corresponding data, can be managed in association with the governing label. For instance, in cases in which the data is labeled as data that should not be exported to a third-party, the data may be prevented from being exported to a third-party.

With reference now to FIG. 8, a flow diagram is provided showing an embodiment of a method 800 for facilitating generation and presentation of governing label recommendations for data (e.g., attributes associated with a dataset), in accordance with embodiments described herein.

Initially, at block 802, a representation of a data schema associated with a dataset having a plurality of attributes obtained. In embodiments, a representation of a data schema may be an embedding (e.g., a contextual embedding). The representation of the data schema may be generated in a number of ways. As one example, a representation of a data schema may be generated using a set of column names that correspond with the dataset.

At block 804, a governing label is identified (e.g., via a multiclass classifier) for a particular attribute of the plurality of attributes based on the representation of the data schema associated with the dataset and a set of attention weights associated with a set of label descriptions. In embodiments, the set of attention weights may be in the form of a vector. Attention weights may be generated in any number of ways. As one example, a sentence embedding for each label description may be generated. Thereafter, attention scores for each label description may be determined using a projection of the representation of the data schema into a query space and a projection of the sentence embeddings to a key space. The attention scores are then normalized to generate the set of attention weights.

At block 806, performance of an action is caused in accordance with the governing label identified for the particular attribute. In one embodiment, the governing label is presented, via a user interface, as a recommended governing label for the particular attribute. In another embodiment, the governing label is automatically assigned to the particular attribute. In this way, the particular attribute, and/or data associated therewith, may be automatically tagged with the governing label. Based on the governing label being applied to the particular attribute, the dataset, or the particular attribute and corresponding data, can be managed in association with the governing label. For instance, in cases in which the data is labeled as data that should not be exported to a third-party, the data may be prevented from being exported to a third-party.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 9:
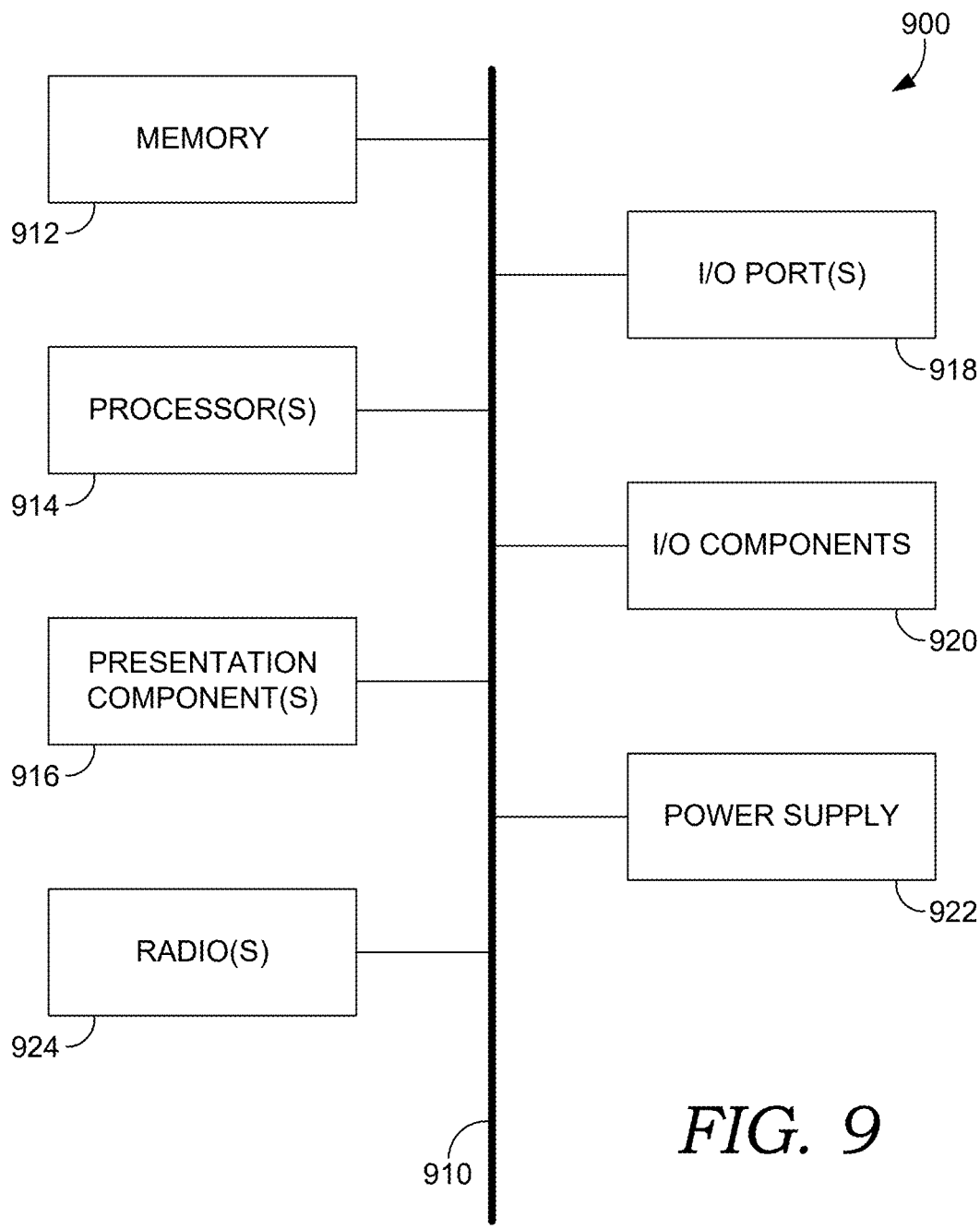
FIG. 9 is a block diagram of an example computing device in which embodiments of the present disclosure can be employed.

Referring to the drawings in general, and initially to FIG. 9 in particular, an exemplary operating environment for implementing aspects of the technology described herein is shown and designated generally as computing device 900. Computing device 900 is just one example of a suitable computing environment and is not intended to suggest any limitation as to the scope of use or functionality of the technology described herein. Neither should the computing device 900 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, an illustrative power supply 922, and a radio(s) 924. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more aspects of the technology described herein. Distinction is not made between such categories as "workstation," "server," "laptop," and "handheld device," as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, and optical-disc drives. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, and vibrating component. I/O port(s) 918 allow computing device 900 to be logically coupled to other devices including I/O components 920, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 900. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include radio(s) 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

The invention claimed is:

1. One or more non-transitory computer-readable media storing executable instructions, which when executed by a processing device, cause the processing device to perform operations comprising:
    obtaining a representation of a data schema associated with a dataset having a plurality of attributes;
    identifying, via a machine learning model, a governing label for a particular attribute of the plurality of attributes based on the representation of the data schema associated with the dataset, wherein the governing label for the particular attribute is identified using a hierarchical classification that models labels via a co-occurrence graph including frequencies of co-occurrence of governing labels; and
    causing display of a recommendation to assign the governing label to the particular attribute in the dataset.

2. The one or more non-transitory computer-readable media of claim 1, wherein the operations further comprise generating the representation of the data schema based on a plurality of column names corresponding with the plurality of attributes.

3. The one or more non-transitory computer-readable media of claim 1, wherein the operations further comprise:
    receiving an indication confirming to assign the governing label to the particular attribute in the dataset; and
    based on the indication confirming to assign the governing label to the particular attribute in the dataset, assigning the governing label to the particular attribute in the dataset.

4. The one or more non-transitory computer-readable media of claim 1, wherein the machine learning model further uses a set of attention weights associated with a set of label descriptions to identify the governing label for the particular attribute.

5. The one or more non-transitory computer-readable media of claim 1, wherein identifying the governing label for the particular attribute includes:
    identifying a cluster of labels applicable to the representation of the data schema based on the co-occurrence graph;
    identifying a set of governing labels, within the cluster of labels, that is applicable to the representation of the data schema; and
    identifying the governing label for the particular attribute based on the cluster of labels applicable to the representation of the data schema and the set of governing labels, within the cluster of labels, applicable to the representation of the data schema.

6. The one or more non-transitory computer-readable media of claim 5, wherein the operations further comprise generating the co-occurrence graph, wherein nodes of the co-occurrence graph represent governing labels and edges of the co-occurrence graph represent the frequencies of co-occurrence of governing labels.

7. The one or more non-transitory computer-readable media of claim 5, wherein the operations further comprise identifying the cluster of labels within the co-occurrence graph, wherein the cluster of labels includes governing labels likely to co-occur with one another.

8. The one or more non-transitory computer-readable media of claim 1, wherein the operations further comprise automatically tagging the attribute or data associated with the attribute with the governing label.

9. A computer-implemented method comprising:
    obtaining a representation of a data schema associated with a dataset having a plurality of attributes;
    identifying, via a client assignment network, a cluster of governing labels applicable to a particular attribute based on the representation of the data schema using a co-occurrence graph including frequencies of co-occurrence between corresponding governing labels;
    identifying, via a cluster classifier layer, a set of governing labels, of the cluster of governing labels, applicable to the particular attribute based on the representation of the data schema;
    identifying, via an aggregate network, a governing label for the particular attribute based on the cluster of governing labels and the set of governing labels, of the cluster of labels, identified as applicable to the particular attribute; and
    causing performance of an action in accordance with the governing label identified for the particular attribute.

10. The computer-implemented method of claim 9, further comprising generating the co-occurrence graph, wherein nodes of the co-occurrence graph represent governing labels and edges of the co-occurrence graph represent the frequencies of co-occurrence between the corresponding governing labels.

11. The computer-implemented method of claim 9, further comprising generating a plurality of clusters of labels within the co-occurrence graph, wherein each cluster of the plurality of clusters of labels includes governing labels likely to co-occur with one another.

12. The computer-implemented method of claim 9 further comprising training at least one of the cluster classifier layer, the client assignment network, and the aggregate network using binary cross-entropy loss.

13. The computer-implemented method of claim 9, wherein the action performed comprises presenting, via a user interface, the governing label as a recommendation in association with the particular attribute.

14. The computer-implemented method of claim 9, wherein the action performed comprises assigning the governing label to the particular attribute.

15. The computer-implemented method of claim 9 further comprising managing the dataset in association with the governing label assigned to the particular attribute.

16. A computing system comprising:
a processor; and
a non-transitory computer-readable medium having stored thereon instructions that when executed by the processor, cause the processor to perform operations including:
obtaining a representation of a data schema associated with a dataset having a plurality of attributes;
identifying a governing label for a particular attribute of the plurality of attributes based on the representation of the data schema associated with the dataset and a set of attention weights associated with a set of label descriptions, wherein the set of attention weights are generated by determining attention scores for each label description of the set of label descriptions using a projection of the representation of the data schema into a query space and a projection of sentence embeddings to a key space; and
causing performance of an action in accordance with the governing label identified for the particular attribute.

17. The computing system of claim 16, wherein generating the set of attention weights further comprises:
generating the sentence embeddings for the label descriptions of the set of label descriptions; and
normalizing the attention scores to generate the set of attention weights.

18. The computing system of claim 16, wherein the action performed comprises presenting, via a user interface, the governing label as a recommendation in association with the particular attribute or assigning the governing label to the particular attribute.

19. The computing system of claim 16, wherein the governing label for the particular attribute is identified using a multiclass classifier that performs classification in accordance with a set of candidate governing labels.

* * * * *